UNITED STATES PATENT OFFICE.

CHAUNCEY PERRY, OF ROCHESTER, NEW YORK.

IMPROVEMENT IN FERTILIZERS.

Specification forming part of Letters Patent No. 149,243, dated March 31, 1874; application filed January 27, 1874.

*To all whom it may concern:*

Be it known that I, CHAUNCEY PERRY, of the city of Rochester, in the county of Monroe and State of New York, have invented a certain new and useful Improvement in Fertilizers; and I do hereby declare that the following is a full, clear, and exact description of the same.

The object of this invention is to stimulate, increase, and force the growth of vegetation by adding to nature's plant-food an additional supply. As nature feeds and nourishes the young plant by the pulp of the parent seed, so it is the object of this invention to add to nature's supply one, two, or three, or more quantities of the plant-food, as may be required or desired. My invention consists in stimulating and forcing the growth of plants by applying as a fertilizer, to seeds or to roots of plants, malt or equivalent portions of grain for plant-food, the germinating principle of such seed or grain having been first destroyed by grinding or malting. It further consists of a fertilizer, the basis of which is malt, the same being combined with any suitable substances to form a compost. It also consists in the combination, with malt, of common manure, calcareous marl, and peat, as hereinafter described.

Barley-malt in itself consists of the following substances, to wit: Ash, starch, fat, albuminoids, (nitrogenous,) dextrine, extractive matter, woody fiber, and is a valuable fertilizer; but to render it the most efficacious for the purpose, it should be combined with manure, calcareous marl, and peat, thereby giving body and rendering the compost rich in nearly all the elements required for the rapid propagation of plants, shrubs, and other vegetation. Malt is rich in organic matter, and is the natural food for plants. The barley, or any other grain or seed when malted, has undergone the same chemical change substantially which the seed is required by nature to undergo in germinating the plant, which renders it nature's food for the plant that it produces, and which it nourishes until the plant is well rooted and able to draw its own sustenance from the earth and air, and is as necessary for its nourishment and growth as the milk of the mammalia is for the nourishment and growth of its young. The larger the seed of its kind, the greater the amount of nutriment it will yield when adapted by the sprouting process in the earth to nourish and invigorate the young plant, and the growth and vigor of the plant is correspondingly greater. These facts are now so well understood that farmers select the largest and fullest seed from which to raise their new crops. The malting process produces substantially the same chemical changes which are produced by sprouting the seed in the ground; consequently malt is the natural food for plants, and therefore the use of this article supplies the very pabulum of nature for the plant, and having this natural food we can supply it to all vegetation *ad libitum;* and when the plant is rendered vigorous by this food, it is able to draw its sustenance from the earth and air, and continue its growth in an increased ratio.

Since the natural food of plants is the parent seed or grain, and that the growth and vigor of the young plant largely depends upon the size of the parent seed, it is evident that the growth of plants may be stimulated, increased, and forced by applying the same or similar materials to seeds or to the roots of plants. Therefore, I stimulate, increase, or force the growth of plants or vegetation by planting with or applying to the planted seed, or by applying near or to the roots of plants, seeds, or grain, which have been prepared for such purpose, by being sprouted, and the sprout or germ destroyed by malting or otherwise, and then ground or not, or prepared by destroying the germinating power by the process of grinding. Any seed or grain prepared as described is the natural food for plants, and acts as a powerful aid and stimulant to the growth of all vegetation; but when the quickest and greatest growth possible is sought for, the food thus prepared should be applied each to its own kind in imitation of nature. In this manner I am able to supply any required amount of nutriment, and thereby stimulate, increase, and force the growth accordingly. If desired, any other suitable stimulant or fertilizer—such as phosphates, bone-dust, guano, or manure—may be applied with the plant-food as nutriment, as herein described, particularly when the soil is deficient in some essential element.

Calcareous marl is valuable and advantageous in all soils which are sandy or clayey or deficient in lime, whether naturally deficient in lime or rendered so by the absorption from successive crops. Peat is a valuable addition to almost all soils. It absorbs and retains in a marked degree moisture, ammonia, and carbonic acid, all indispensable to the growing plant. As a constituent with which to compound the malt and manure it is very effective. It absorbs the gases or volatile substances of the compost, and retains them until absorbed by the plants. In itself it possesses a large amount of carbon. From this compound a large amount of ammonia, together with other substances, is evolved, which are essential to the rapid growth of plants.

The proportion of ingredients may be varied to suit the soils to be fertilized; but for all ordinary soils and purposes I prefer the following proportions by measure: Ground malt, one-third; manure, one-third; calcareous marl, one-sixth; peat, one-sixth, all dried, pulverized, and well mixed together. This compost makes the most effective fertilizer with which I am acquainted; also, the grains or seeds before malting may be used in place of the malt, and, by its decomposition in the ground, will make a valuable manure; but the chemical change necessary to feed vegetation must be slower and less direct to the plants; but when immediate rapid growth is not so much required, and a cheaper compost is desired, the grain or seeds may be used in the compost instead of the malt, prepared and mixed as above stated.

Having thus described my invention, what I claim as new is—

1. The method herein described for stimulating and forcing the growth of plants, consisting in applying, as a fertilizer, to seeds or to roots of plants, malt or equivalent proportions of grain for plant-food, substantially as described.

2. A fertilizing compound made of malt or grain prepared as described, and combined with any of the usual fertilizers, as and for the purpose set forth.

3. A fertilizer consisting of ground or pulverized malt, or ground grain or seeds without malting, combined with other suitable substances to form a compost.

4. The combination, with ground malt, or ground grain or seeds without malting, of common manure, calcareous marl, and peat, for the purpose specified.

In witness whereof I have hereunto signed my name in the presence of two subscribing witnesses.

CHAUNCEY PERRY.

Witnesses:
R. F. OSGOOD,
J. S. GARLOCK.